United States Patent
Zhao et al.

(10) Patent No.: US 11,515,633 B2
(45) Date of Patent: Nov. 29, 2022

(54) ANTENNA AND MOBILE TERMINAL

(71) Applicant: Huawei Technologies Co., Ltd., Shenzhen (CN)

(72) Inventors: Chongfeng Zhao, Xi'an (CN); Kun Li, Xi'an (CN); Bao Lu, Shenzhen (CN); Yu Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 16/640,517

(22) PCT Filed: Aug. 23, 2018

(86) PCT No.: PCT/CN2018/101947
§ 371 (c)(1),
(2) Date: Feb. 20, 2020

(87) PCT Pub. No.: WO2019/085604
PCT Pub. Date: May 9, 2019

(65) Prior Publication Data
US 2020/0365992 A1 Nov. 19, 2020

(30) Foreign Application Priority Data
Oct. 31, 2017 (CN) .......................... 201711046227.X

(51) Int. Cl.
*H01Q 7/00* (2006.01)
*H01Q 9/04* (2006.01)
(Continued)

(52) U.S. Cl.
CPC ................ *H01Q 9/045* (2013.01); *H01Q 7/00* (2013.01); *H01Q 9/30* (2013.01); *H01Q 1/2258* (2013.01); *H04W 88/02* (2013.01)

(58) Field of Classification Search
CPC ............ H01Q 9/045; H01Q 7/00; H01Q 9/30; H01Q 1/2258; H01Q 5/314; H01Q 9/42; H04W 88/02; H04M 1/02
See application file for complete search history.

(56) References Cited

U.S. PATENT DOCUMENTS

| 9,024,823 B2 | 5/2015 | Bevelacqua |
| 2005/0119035 A1 | 6/2005 | Miyano et al. |

(Continued)

FOREIGN PATENT DOCUMENTS

| CN | 102386485 A | 3/2012 |
| CN | 202978926 U | 6/2013 |

(Continued)

*Primary Examiner* — Dimary S Lopez Cruz
*Assistant Examiner* — Michael M Bouizza
(74) *Attorney, Agent, or Firm* — Conley Rose, P.C.

(57) ABSTRACT

A mobile terminal and an antenna that includes a feeder and a radiating element. The radiating element includes a first radiating patch and a second radiating patch. The first radiating patch and the second radiating patch are located on one side of the feeder and form a loop together with the feeder. An adjustable component configured to control the feeder and the second radiating patch is disposed on the feeder between the first radiating patch and the second radiating patch. The first radiating patch has a first extension part extending to an opposing side of the feeder.

20 Claims, 10 Drawing Sheets

(51) Int. Cl.
*H01Q 9/30* (2006.01)
*H01Q 1/22* (2006.01)
*H04W 88/02* (2009.01)

(56) References Cited

U.S. PATENT DOCUMENTS

| | | | |
|---|---|---|---|
| 2015/0054701 A1* | 2/2015 | Kim | H01Q 9/42 |
| | | | 343/750 |
| 2015/0065066 A1 | 3/2015 | Kang | |
| 2015/0116168 A1* | 4/2015 | Yosui | H01Q 7/00 |
| | | | 343/722 |
| 2015/0255869 A1 | 9/2015 | Sorensen et al. | |

FOREIGN PATENT DOCUMENTS

| | | |
|---|---|---|
| CN | 104426575 A | 3/2015 |
| CN | 104701619 A | 6/2015 |
| CN | 105474460 A | 4/2016 |
| CN | 206148622 U | 5/2017 |
| EP | 2448061 B1 | 3/2017 |
| JP | 2008294748 A | 12/2008 |
| JP | 4363936 B2 | 11/2009 |
| KR | 20090091954 A | 8/2009 |
| KR | 20120100445 A | 9/2012 |
| WO | 2012111037 A1 | 8/2012 |

\* cited by examiner

ANTENNA AND MOBILE TERMINAL

CROSS-REFERENCE TO RELATED APPLICATIONS

This application is a U.S. National Stage of International Patent Application No. PCT/CN2018/101947 filed on Aug. 23, 2018, which claims priority to Chinese Patent Application No. 201711046227.X filed on Oct. 31, 2017. Both of the aforementioned applications are hereby incorporated by reference in their entireties.

TECHNICAL FIELD

This application relates to the field of communications technologies, and in particular, to an antenna and a mobile terminal.

BACKGROUND

With an increasing requirement of a user on portability and aesthetic appearance of a product, space of an antenna of a terminal product is increasingly compressed. The antenna usually needs to be designed in a complex environment including various devices. When the complex environment conflicts with a conventional antenna design requirement, an antenna engineer urgently needs to design an antenna with higher efficiency and a higher bandwidth.

SUMMARY

This application provides an antenna and a mobile terminal, to improve a communication effect of the antenna.

According to a first aspect, an antenna is provided. The antenna includes a feeder and a radiating element. The radiating element includes a first radiating patch and a second radiating patch. The first radiating patch and the second radiating patch are located on one side of the feeder and form a loop together with the feeder. An adjustable component configured to control the feeder and the second radiating patch to be conducted is disposed on the feeder. The adjustable component is located between the first radiating patch and the second radiating patch.

The first radiating patch has a first extension part extending to the other side of the feeder.

In the foregoing technical solution, the radiating element includes the two radiating patches. The feeder controls an electrical connection between the radiating patches by using the adjustable component, so that the radiating patches can form radiators of different shapes, and further form different structure forms of the antenna. Therefore, the different structure forms of the antenna may be selected based on a low frequency status or a high frequency status to send a signal, so as to improve the communication effect of the antenna.

In a specific implementation solution, the second radiating patch has a second extension part extending to the other side of the feeder, and one end of the first extension part far from the feeder is electrically connected to one end of the second extension part far from the feeder. Therefore, a radiation effect of the radiating element is improved.

In a specific implementation solution, the end of the first extension part far from the feeder is electrically connected to the end of the second extension part far from the feeder by using a spring. Two ends of the first radiating patch are respectively electrically connected to two ends of the second radiating patch by using the spring. The two ends of the first radiating patch may be further respectively electrically connected to the two ends of the second radiating patch by using the spring in another manner, for example, by using a flexible circuit board, a printed circuit board, or a printed metal layer.

In a specific implementation solution, one end of the first radiating patch far from the feeder is electrically connected to one end of the second radiating patch far from the feeder by using a spring. The end of the first radiating patch far from the feeder may be further electrically connected to the end of the second radiating patch far from the feeder by using the spring in another manner, for example, by using a flexible circuit board, a printed circuit board, or a printed metal layer.

In a specific implementation solution, when the adjustable component is conducted, the antenna is a T-shaped antenna, and when the adjustable component is disconnected, the antenna is a monopole antenna. When only the first extension part is included, the antenna may control the adjustable component to form the T-shaped antenna or the monopole antenna.

In a specific implementation solution, when the adjustable component is disconnected, the antenna is a loop antenna; and when the adjustable component is conducted, the antenna is a T-shaped antenna. When both the first extension part and the second extension part are included, the antenna may control the adjustable component to form the T-shaped antenna or the loop antenna.

In a specific implementation solution, the end of the first extension part far from the feeder is in a bending structure.

In a specific implementation solution, the radiating element further includes at least one branch, and the at least one branch is electrically connected to the first radiating patch or the second radiating patch. To be specific, by using the disposed branch, the communication effect of the antenna is further improved. The branch may be in different shapes such as an L-shaped bending structure or a straight strip shape. In addition, when the branch is specifically connected, the branch may be disposed on the first radiating patch, or may be disposed on the second radiating patch.

In a specific implementation solution, the adjustable component is a control switch. A status of an electrical connection between the feeder and the second radiating patch may be controlled through turn-on or turn-off of the control switch.

In a specific implementation solution, the adjustable component is an adjustable capacitor A status of an electrical connection between the feeder and the second radiating patch is controlled by adjusting a capacitance value of the adjustable capacitor. When the capacitance value is 0, the feeder is directly connected to the second radiating patch. When the capacitance value reaches a specific value, the feeder is not directly connected to a second radiating element at a low frequency, and the feeder is connected to the second radiating patch at a high frequency.

In a specific implementation solution, the adjustable component may alternatively be a capacitor, an inductor, or a filtering network, and the filtering network includes a lumped component and a distributed capacitor or inductor.

In a specific implementation solution, the second radiating patch is a metal frame or a middle frame of a mobile terminal, or a flexible circuit board disposed in the metal frame, and the first radiating patch is a flexible circuit board. In other words, different structures may be used as the first radiating patch and the second radiating patch.

According to a second aspect, a mobile terminal is provided. The mobile terminal includes the antenna according to any one of the foregoing implementation solutions.

In the foregoing technical solution, the radiating element includes the two radiating patches. The feeder controls an electrical connection between the radiating patches by using the adjustable component, so that the radiating patches can form radiators of different shapes, and further form different structure forms of the antenna. Therefore, the different structure forms of the antenna may be selected based on a low frequency status or a high frequency status to send a signal, so as to improve the communication effect of the antenna.

DESCRIPTION OF EMBODIMENTS

Figure 1:
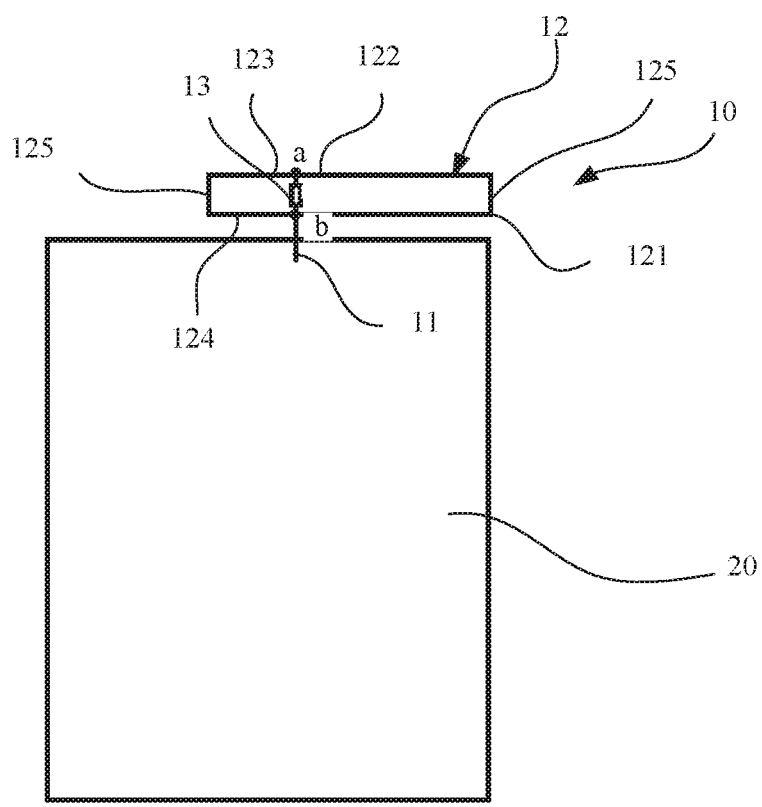
FIG. 1 is a schematic structural diagram of an antenna according to an embodiment of the present invention.

To make the objectives, technical solutions, and advantages of this application clearer, the following further describes this application in detail with reference to the accompanying drawings.

In the embodiments of the present invention, to resolve a prior-art problem that a T-shaped antenna cannot adapt to a severe environment in a mobile terminal, and improve a communication effect of an antenna in the mobile terminal, the embodiments of the present invention provide an antenna 10. The antenna 10 includes two parts: a feeder 11 and a radiating element 12. An adjustable component 13 is disposed on the feeder 11, and the adjustable component 13 may change a form of an electrical connection between the feeder 11 and the radiating element 12, to form different antenna structures, for example, a combination of a loop antenna and a T-shaped antenna. Switching between the loop antenna and the T-shaped antenna may be implemented by adjusting a connection and a disconnection of the adjustable component 13. Alternatively, there may be a combination of a monopole antenna and a T-shaped antenna. Switching between the two antennas 10 may also be controlled by using the adjustable component 13.

The following describes the antenna 10 provided in this application in detail with reference to the accompanying drawings and specific embodiments. It should be first noted that, in the following description, the two components are electrically connected means that the two components may be conductively connected.

FIG. 1 shows a structure of an antenna 10 according to an embodiment of the present invention. The feeder 11 is separately electrically connected to a radiating element 12 and a mainboard 20. The mainboard 20 is a mainboard 20 in a mobile terminal, and a feedpoint is disposed on the mainboard 20. The feeder 11 is electrically connected to the feedpoint on the mainboard 20, and transmits a signal to the radiating element 12, and then the radiating element 12 sends the signal. During specific disposition, the radiating element 12 includes two parts: which are respectively a second radiating patch 121 and a first radiating patch 122. The second radiating patch 121 and the first radiating patch 122 are located on one side of the feeder and form a loop together with the feeder 11. An adjustable component 13 configured to control the feeder 11 and the first radiating patch 122 to be conducted is disposed on the feeder 11, and a location at which the adjustable component 13 is disposed is between the second radiating patch 121 and the first radiating patch 122.

As shown in FIG. 1, the second radiating patch 121 and the first radiating patch 122 are disposed in a parallel manner or in an approximately parallel manner. When the feeder 11 together with the second radiating patch 121 and the first radiating patch 122 form the loop, one end of the second radiating patch 121 and one end of the first radiating patch 122 are connected by using the feeder 11, and the other end of the second radiating patch 121 and the other end of the first radiating patch 122 are connected by using a spring 125, so as to form the loop. A connection point between the feeder 11 and the second radiating patch 121 and a connection point between the feeder 11 and the first radiating patch 122 are respectively a connection point a and a connection point b. As shown in FIG. 1, the adjustable component 13 is disposed between the connection point a and the connection point b. A status of a connection between the feeder 11 and the first radiating patch 122 may be controlled by using the adjustable component 13, so as to change a type of the antenna.

The following describes the antenna provided in this embodiment of the present invention in detail with reference to FIG. 1. As shown in FIG. 1, in addition to the second radiating patch 121 and the first radiating patch 122, the radiating element in the antenna provided in this embodiment of the present invention may further include a second extension part 124, of the second radiating patch 121, that extends to the other side of the feeder 11, and a first extension part 123, of the first radiating patch 122, that extends to the other side of the feeder 11. As shown in FIG. 1, when the second radiating patch 121 and the first radiating patch 122 each have an extension part, a placement direction of the antenna shown in FIG. 1 is a reference direction. The second radiating patch 121 and the first radiating patch 122 are located on the right of the feeder 11, and the second extension part 124 and the first extension part 123 are located on the left of the feeder 11. One end of the second radiating patch 121 far from the feeder 11 and one end of the first radiating patch 122 far from the feeder 11 are connected by using a spring 125, and one end of the second extension part 124 far from the feeder 11 and one end of the first extension part 123 far from the feeder 11 are also electrically connected. Specifically, the second extension part 124 and the first extension part 123 are electrically connected by using a spring 125. It should be understood that another connecting component that may implement an electrical connection between the second extension part 124 and the first extension part 123 may also be applied to this embodiment. It can be learned from the structure shown in FIG. 1 that the entire radiating element includes the second radiating patch 121, the second extension part 124, the first radiating patch 122, the first extension part 123, the spring 125 configured to connect the second radiating patch 121 and the first radiating patch 122, the spring 125 configured to connect the second extension part 124 and the first extension part 123, and a loop radiation structure of the loop antenna formed by the second radiating patch 121, the second extension part 124, the spring 125, the first extension part 123, and the first radiating patch 122. The feeder 11 passes through the loop, and is separately connected to the second radiating patch 121 and the first radiating patch 122. In this structure, the antenna may be switched between the T-shaped antenna and the loop antenna.

When the structure shown in FIG. 1 is used, the second radiating patch 121 and the second extension part 124 may be in an integrated structure, and the first radiating patch 122 and the first extension part 123 may also be in an integrated structure. In addition, different components in the mobile terminal may be used as the second radiating patch 121, the second extension part 124, the first radiating patch 122, and the first extension part 123 in the radiating element, for example, by using a flexible circuit board, a front housing steel sheet, or a printed circuit of the mobile terminal, or by using a metal frame or a metal back housing having a split. More specifically, the first radiating patch 122 and the first extension part 123 each are a metal frame or a middle frame of the mobile terminal, or a flexible circuit board disposed in the metal frame. The second radiating patch 121 and the second extension part 124 are a layer of the flexible circuit board.

In addition, when the end of the second radiating patch 121 far from the feeder 11 and the end of the first radiating patch 122 far from the feeder 11 are connected, in addition to the foregoing spring 125, an end part of the second radiating patch 121 or the first radiating patch 122 may be bent and extended, and is connected to another radiating patch. Alternatively, the second radiating patch 121 and the first radiating patch 122 may be in the integrated structure: A U-shaped structure is directly manufactured during manufacturing. Certainly, the connection may be further implemented in another manner, for example, by using a flexible circuit board, a printed circuit board, or a printed metal layer. It can be learned from the foregoing description that the end of the second radiating patch 121 far from the feeder may be connected to the end of the first radiating patch 122 far from the feeder in different manners. Similarly, the second extension part 124 may also be connected to the first extension part 123 in the manner in which the second radiating patch 121 is connected to the first radiating patch 122. Details are not described herein again.

It can be learned from the foregoing description that, in this embodiment of the present invention, the radiating element 12 only needs to be disposed in a loop. In the prior art, all structures that can implement connections of the second radiating patch 121, the second extension part 124, the first radiating patch 122, and the first radiating patch 122 can be applied to this embodiment. In addition, a specific loop structure is not limited to the rectangular loop structure shown in FIG. 1, but may be some other transformed structures, for example, an ellipse.

Still referring to FIG. 1, in this embodiment, when the feeder 11 is connected to the second radiating patch 121 and the first radiating patch 122, the feeder 11 is in a straight strip structure, or certainly may be in another shape, for example, is bent to some extent. Specifically, as shown in FIG. 1, a connection point between the feeder 11 and the second radiating patch 121 is the connection point a, and a connection point between the feeder 11 and the first radiating patch 122 is the connection point b. The adjustable component 13 is disposed between the connection point a and the connection point b.

In this embodiment of the present invention, a structure of the antenna 10 is changed by using the adjustable component 13 disposed on the feeder 11, so that the antenna 10 is switched between the T-shaped antenna and the loop antenna. Specific switching is actually implemented by using a selective electrical connection between the feeder 11 and the first radiating patch 122. To facilitate understanding of the switching structure of the antenna 10 provided in this embodiment, the following describes a working status of the adjustable component 13 in detail with reference to FIG. 1.

Figure 2:
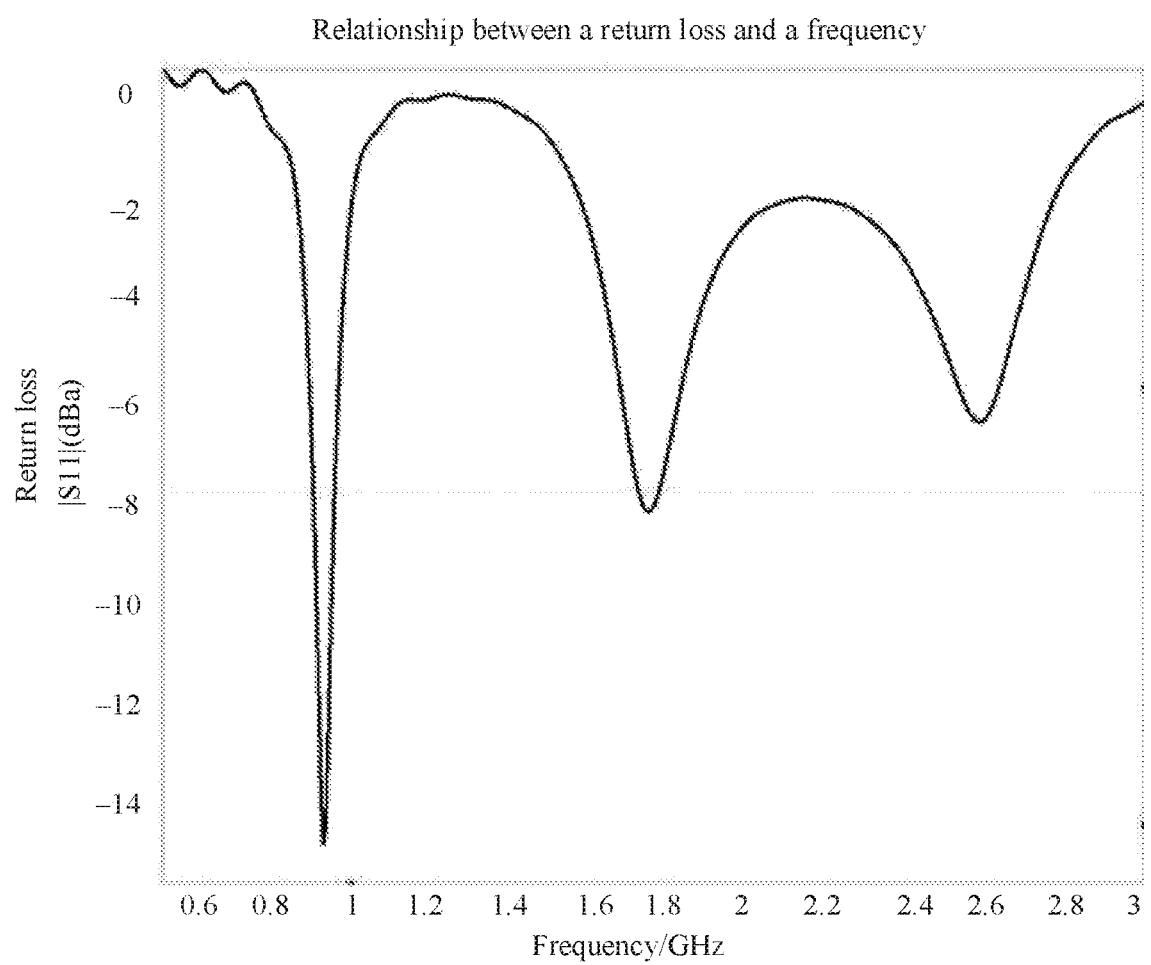
FIG. 2 is a schematic diagram of a return loss of an antenna in a T-shaped antenna mode according to an embodiment of the present invention.
Figure 3:
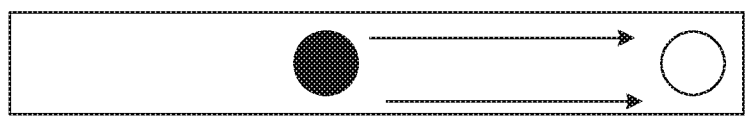
FIG. 3 is a schematic diagram of current of an antenna in a long arm $\lambda/4$ mode in a T-shaped antenna mode according to an embodiment of the present invention.
Figure 4:
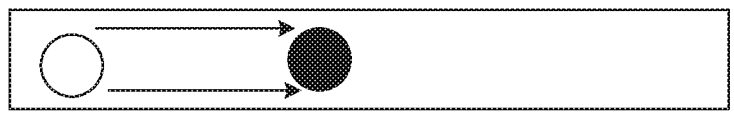
FIG. 4 is a schematic diagram of current of an antenna in a short arm $\lambda/4$ mode in a T-shaped antenna mode according to an embodiment of the present invention.
Figure 5:
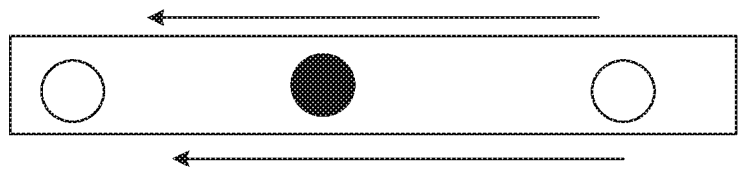
FIG. 5 is a schematic diagram of current of an antenna in a full arm $\lambda/2$ mode in a T-shaped antenna mode according to an embodiment of the present invention.

When the adjustable component 13 is conducted, it may be understood that the adjustable component 13 is 0-Ohm (ohm) straight-through, and the feeder 11 is directly electrically connected to the second radiating patch 121 and the first radiating patch 122. In this case, current on the second radiating patch 121 flows from the connection point a between the feeder 11 and the second radiating patch 121 to end parts of the second radiating patch 121 and the second extension part 124. In addition, current on the first radiating patch 122 flows from the connection point b between the feeder 11 and the first radiating patch 122 to end pasts of the first radiating patch 122 and the first extension part 123. In this case, the entire radiating element 12 is in a long strip structure, the current flow of the entire antenna 10 is similar to that of the T-shaped antenna. To understand an effect of the antenna, the antenna 10 shown in FIG. 1 is simulated. As shown in FIG. 2, within 3 GHz, the antenna 10 has three resonances, which are sequentially a long arm $\lambda/4$ mode, a $\lambda/2$ full arm mode, and a short arm $\lambda/4$ mode. In FIG. 3 to FIG. 5, a black circle represents a maximum current point, and a white circle represents a minimum current point. FIG. 3 is a schematic diagram in which current flows on a radiating element when an antenna is in a long arm λ/4 mode. FIG. 4 is a schematic diagram in which current flows on a radiating element when an antenna is in a λ/2 full arm mode. FIG. 5 is a schematic diagram in which current flows on a radiating element when an antenna is in a short arm λ/4 mode. It can be learned from FIG. 2 to FIG. 5 that modes of the antenna and the T-shaped antenna 10 provided in this embodiment of the present invention are basically the same. Therefore, in this embodiment of the present invention, when the adjustable component is conducted, the antenna may be completely equivalent to a T-shaped antenna.

Figure 6:
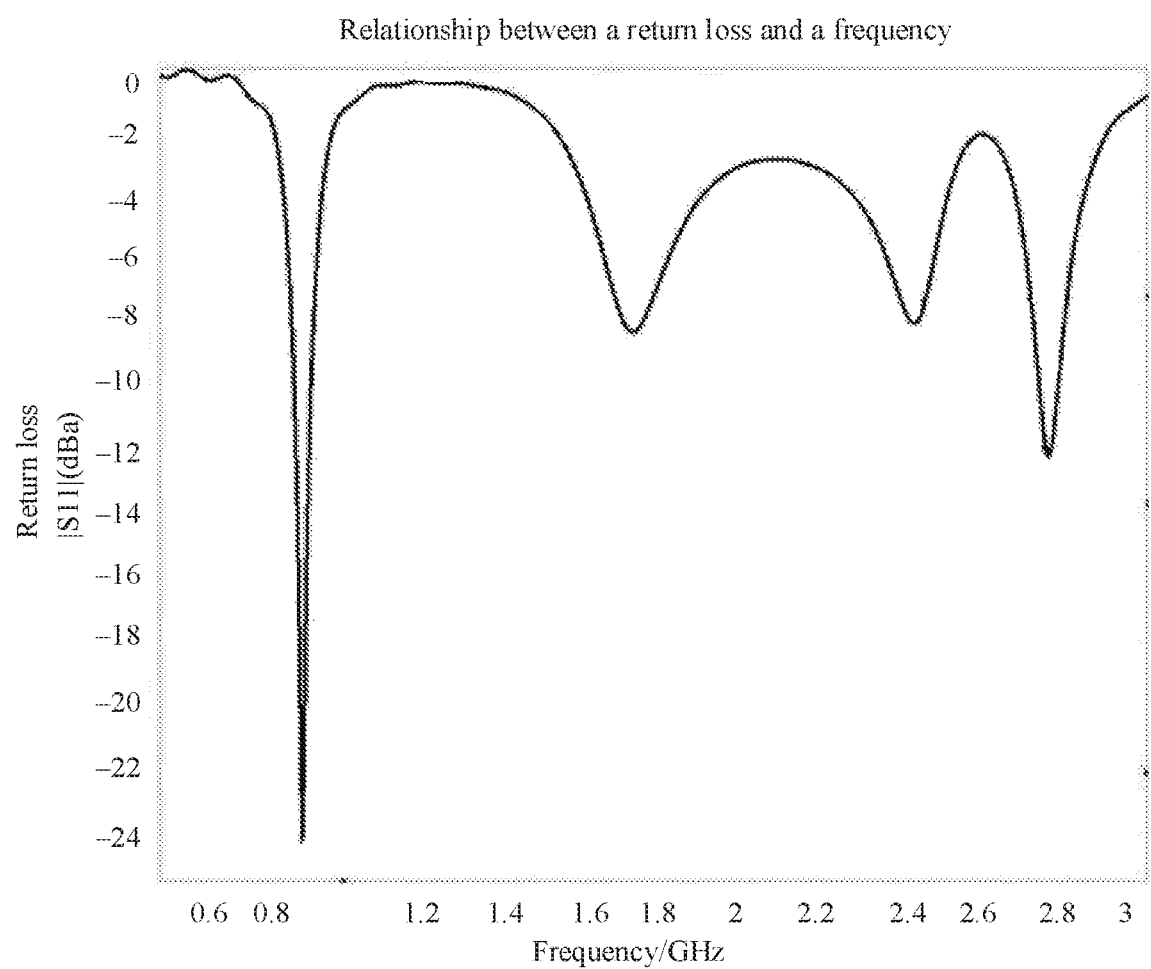
FIG. 6 is a schematic diagram of a return loss of an antenna in a loop antenna mode according to an embodiment of the present invention.
Figure 7:
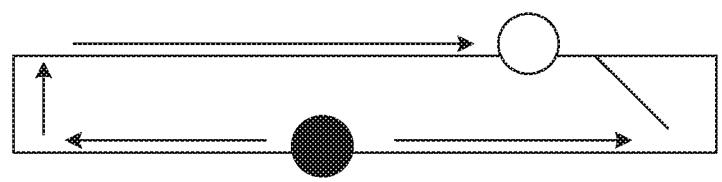
FIG. 7 is a schematic diagram of current of an antenna in a $\lambda/2$ loop mode in a loop antenna mode according to an embodiment of the present invention.
Figure 8:
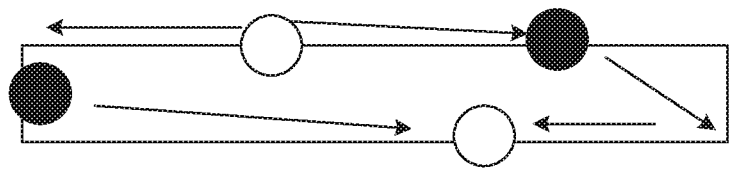
FIG. 8 is a schematic diagram of current of an antenna in a $\lambda$ loop mode in a loop antenna mode according to an embodiment of the present invention.
Figure 9:
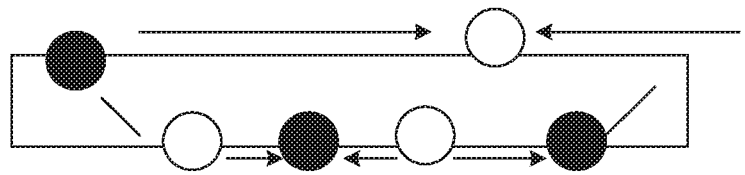
FIG. 9 is a schematic diagram of current of an antenna in a $3\lambda/2$ loop mode in a loop antenna mode according to an embodiment of the present invention.
Figure 10:
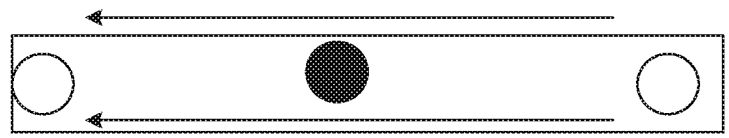
FIG. 10 is a schematic diagram of current of an antenna in a full arm $\lambda/2$ mode in a loop antenna mode according to an embodiment of the present invention.

When the adjustable component 13 is disconnected, the feeder 11 is connected to the second radiating patch 121 and the second extension part 124, and is not connected to the first radiating patch 122. In this case, the radiating element 12 is in a loop structure, and is equivalent to a loop. The antenna 10 is simulated as a loop antenna. As shown in FIG. 6, within 3 GHz, the antenna 10 has four resonances, which are sequentially a λ/2 loop mode, a λ/2 full arm mode, a λ loop mode, and a 3λ/2 loop mode. In FIG. 7 to FIG. 10, a black circle represents a maximum current point, and a white circle represents a minimum current point. FIG. 7 is a schematic diagram in which current flows on a radiating element when an antenna is in a λ/2 loop mode. FIG. 8 is a schematic diagram in which current flows on a radiating element when an antenna is in a λ/2 full arm mode. FIG. 9 is a schematic diagram in which current flows on a radiating element when an antenna is in a λ loop mode. FIG. 10 is a schematic diagram in which current flows on a radiating element when an antenna is in a 3λ/2 loop mode. It can be learned from FIG. 6 to FIG. 10 that, when the adjustable component of the antenna in this embodiment of the present invention is disconnected, the antenna may be completely equivalent to a loop antenna.

Figure 11:
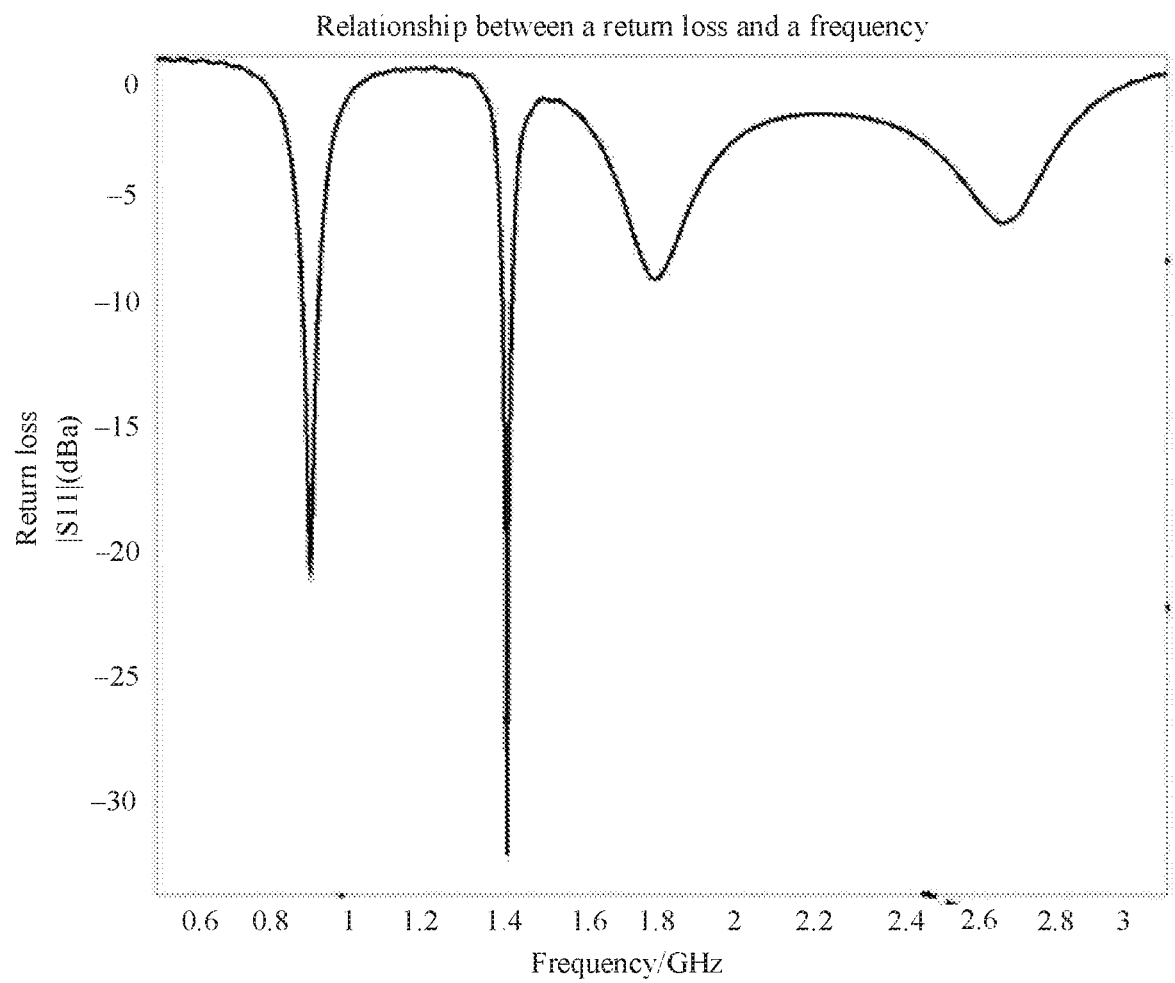
FIG. 11 is a schematic diagram of a return loss of an antenna when an adjustable capacitor is used according to an embodiment of the present invention.
Figure 12:
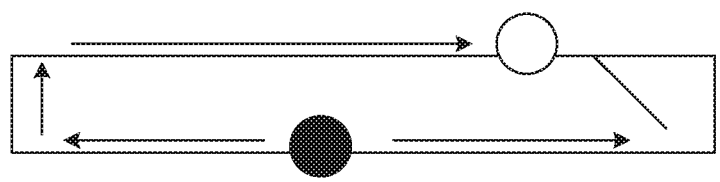
FIG. 12 is a schematic diagram of current of an antenna in a $\lambda/2$ loop mode when an adjustable capacitor is used according to an embodiment of the present invention.
Figure 13:
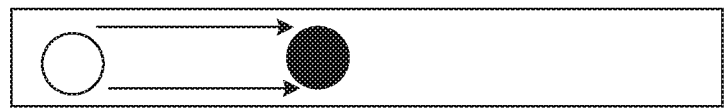
FIG. 13 is a schematic diagram of current of an antenna in a short arm $\lambda/4$ mode when an adjustable capacitor is used according to an embodiment of the present invention.
Figure 14:
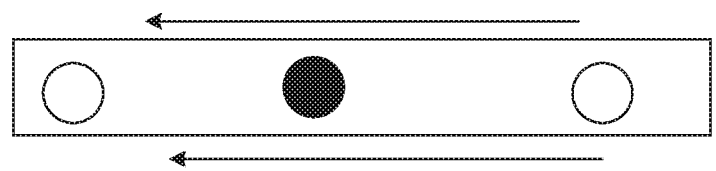
FIG. 14 is a schematic diagram of current of an antenna in a full arm $\lambda/2$ mode when an adjustable capacitor is used according to an embodiment of the present invention.
Figure 15:
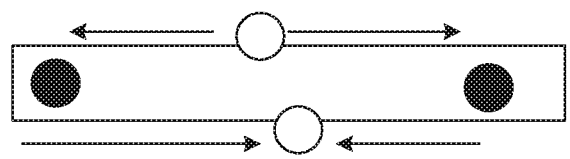
FIG. 15 is a schematic diagram of current of an antenna in a $\lambda$ loop mode when an adjustable capacitor is used according to an embodiment of the present invention.

In addition, the adjustable component 13 may be further implemented in another manner. To be specific, the adjustable component 13 is disconnected at a low frequency, and the adjustable component 13 is conducted at a high frequency. In this case, the antenna 10 is used as the T-shaped antenna when a low frequency signal passes, and the antenna is used as the loop antenna when a high frequency signal passes. FIG. 11 shows simulation performed on the antenna 10 in this state. There are four resonances within 3 GHz, which are sequentially a λ/2 loop mode, a short arm λ/4 mode, a full arm λ/2 mode, and a λ loop mode. In FIG. 12 to FIG. 15, a black circle represents a maximum current point, and a white circle represents a minimum current point. FIG. 12 is a schematic diagram in which current flows on a radiating element when an antenna is in a λ/2 loop mode. FIG. 13 is a schematic diagram in which current flows on a radiating element when an antenna is in a short arm λ/4 mode. FIG. 14 is a schematic diagram in which current flows on a radiating element when an antenna is in a full arm λ/2 mode. FIG. 15 is a schematic diagram in which current flows on a radiating element when an antenna is in a λ loop mode.

When the foregoing functions are implemented, different components may be used for implementation. For example, the adjustable component 13 may be a control switch, a capacitor, an inductor, or a filtering network, and the filtering network includes a lumped component and a distributed capacitor inductor. When the capacitor is used, the capacitor is a capacitor with a relatively large capacitance value, and the inductor is an inductor with a relatively small inductance value. Several specific cases are listed below. In one case, the adjustable component 13 is a control switch, and the control switch may be a single pole single throw switch. Specifically, two ends of the switch may be controlled to separately connect to the feeder 11. In this case, the feeder 11 includes two ends that are respectively located on two sides of the control switch, or the two ends of the control switch are respectively electrically connected to the feeder 11 and the first radiating patch 122. In either manner, a status of an electrical connection between the feeder 11 and the first radiating patch 122 may be controlled through turn-on or turn-off of the control switch.

In another case, the adjustable component 13 is an adjustable capacitor, and a status of an electrical connection between the feeder 11 and the first radiating patch 122 is controlled by adjusting a capacitance value of the adjustable capacitor. When the capacitance value is 0, the feeder 11 is directly electrically connected to the first radiating patch 122. When the capacitance value reaches a specific value, the feeder 11 is not directly electrically connected to a second radiating element 12 at a low frequency, and the feeder 11 is electrically connected to the first radiating patch 122 at a high frequency.

In another case, the adjustable component 13 is a combined component. Specifically, the adjustable component 13 is separately electrically connected to the feeder 11 and the first radiating patch 122. Only a control switch is disposed on one of the branches, both a control switch and a capacitor are disposed on the other branches, and capacitance values of capacitors disposed on different branches are different. To be specific, the adjustable component 13 includes branches of different components, and specifically, only one branch can be closed. During use, by selecting different branches, the adjustable component 13 is in different connection states. For example, when only one branch of the control switch takes effect, switching between the T-shaped antenna 10 and the loop antenna 10 may be implemented when the control switch is disconnected and closed. When a branch on which a capacitor is disposed takes effect, the branch may implement the loop antenna 10 at a high frequency, and implement the T-shaped antenna 10 at a low frequency. Different control switches are turned off to select different branches to electrically connect the feeder 11 and the first radiating patch 122, so as to control a status of an electrical connection between the feeder 11 and the first radiating patch 122.

Figure 16:
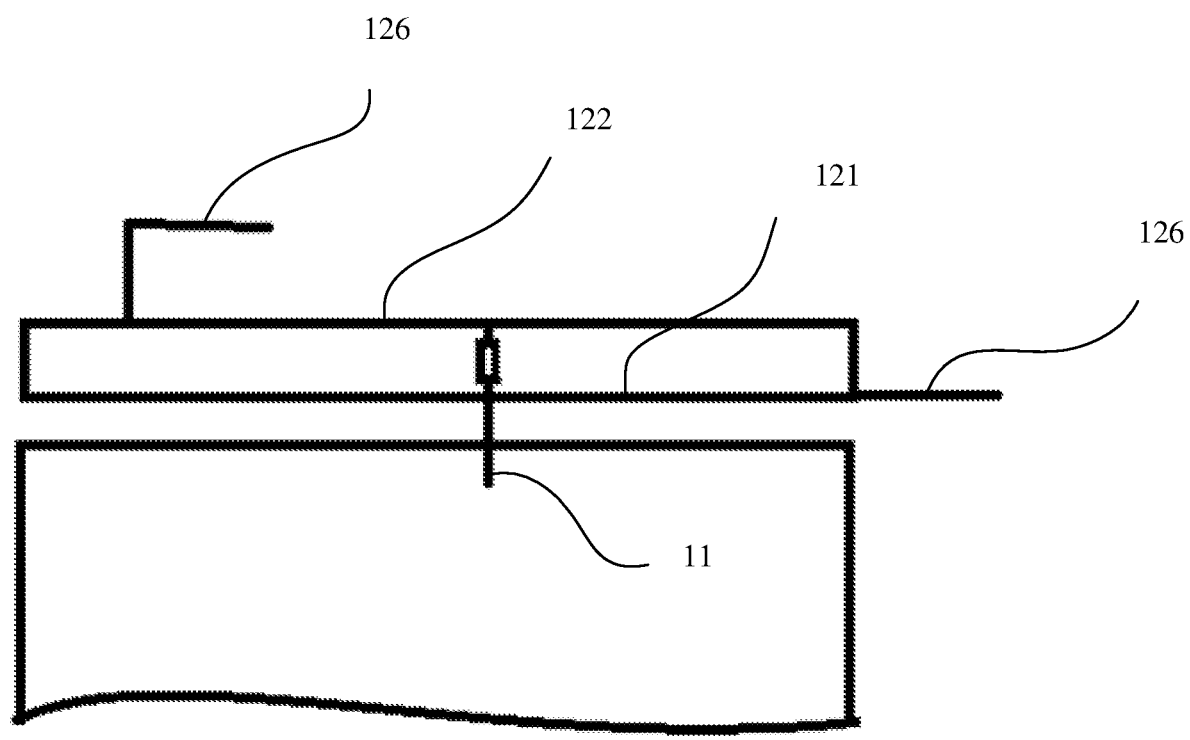
FIG. 16 is a schematic diagram of a transformed structure of an antenna according to an embodiment of the present invention.

In addition, to improve radiation performance of the antenna 10, the radiating element 12 provided in this embodiment of the present invention may further have some transformed structure forms. FIG. 16 shows a transformed radiating element 12. In this case, the radiating element 12 further includes at least one branch 126, and the at least one branch 126 is electrically connected to the second radiating patch 121, or the at least one branch 126 is electrically connected to the first radiating patch 122. FIG. 16 shows two branches 126. One branch 126 is disposed on the first extension part 123, and the other branch 126 is disposed on the first radiating patch 122, so that a communication effect of the antenna 10 can be further improved by using the disposed branches 126. During specific disposition, the branch 126 may be in different shapes, for example, in an L-shaped bending structure or a straight strip shape. As shown in FIG. 16, the branch 126 disposed on the second radiating patch 121 is in a straight strip shape, and the branch 126 disposed on the first extension part 123 is in the L-shaped bending structure.

It can be learned from the foregoing description, when the radiating element 12 includes the two radiating patches, and the feeder 11 controls an electrical connection between the radiating patches by using the adjustable component 13, so that the radiating patches can form radiators of different shapes, and further form different structure forms of the antenna 10. Therefore, the different structure forms of the antenna 10 may be selected based on a low frequency status or a high frequency status to send a signal, so as to improve the communication effect of the antenna 10.

Figure 17:
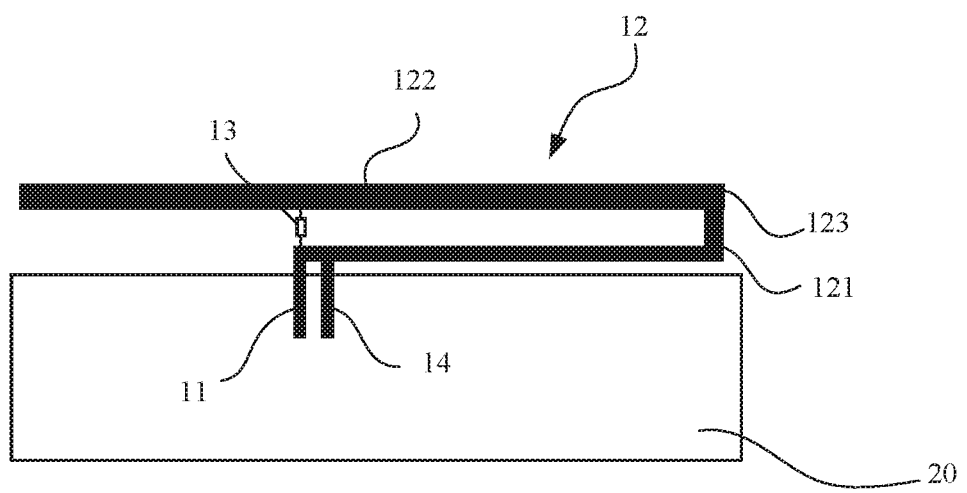
FIG. 17 is a schematic structural diagram of an antenna according to an embodiment of the present invention.

In addition, in this embodiment of the present invention, a radiating element in another structural form other than the radiating element shown in FIG. 1 may alternatively be used. As shown in FIG. 17, in the radiating elements shown in FIG. 17, only the first extension part 123 that extending to another side of the feeder 11 (on the left side shown in FIG. 17) is disposed on the first radiating patch 122.

Figure 18:
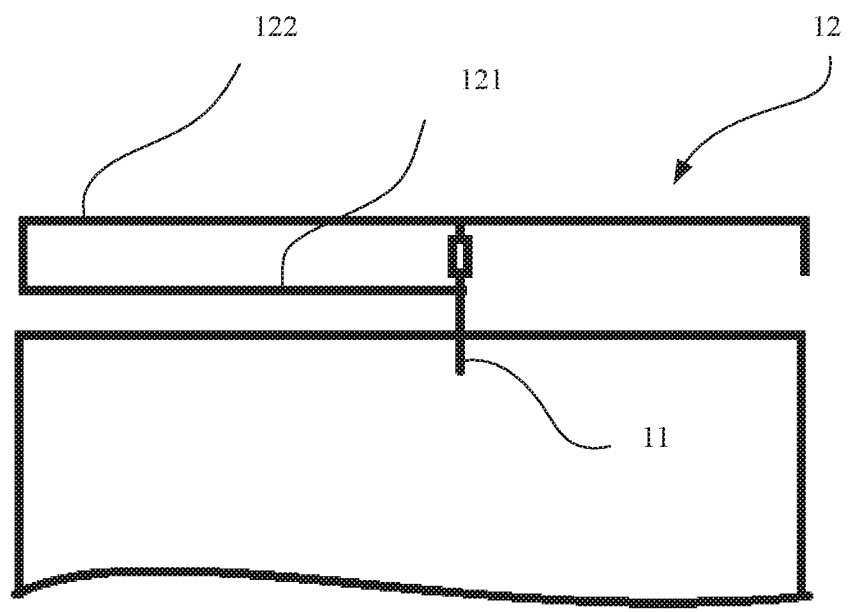
FIG. 18 is a schematic diagram of a transformed structure of an antenna according to an embodiment of the present invention.

Still referring to FIG. 17 and FIG. 18, in this embodiment, one end of the second radiating patch 121 far from the feeder 11 is connected to one end of the first radiating patch 122 far from the feeder 11 by using a spring 125, and a first extension part 123 located on the other side of the feeder 11 is disposed on the first radiating patch 122. In addition, when the first extension part 123 is specifically disposed, the first extension part 123 may be in a straight strip shape, or may be in another shape. As shown in FIG. 18, in a specific implementation solution, one end of the first extension part 123 far from the feeder 11 is in a bending structure.

In addition, during specific disposition, a loop formed by the feeder 11, the second radiating patch 121, and the first radiating patch 122 may be located on different sides of the feeder 11. As shown in FIG. 17, the loop formed by the feeder 11, the second radiating patch 121, and the first radiating patch 122 is on the right of the feeder 11. As shown in FIG. 18, a loop formed by the feeder 11, the second radiating patch 121, and the first radiating patch 122 is on the left of the feeder 11.

In addition, in this embodiment, FIG. 17 further shows a location of a ground cable 14, and the ground cable 14 is connected to the second radiating patch 121.

When the structures shown in FIG. 17 and FIG. 18 are used, the antenna may have different types under control of the adjustable component 13. When the adjustable component 13 is conducted, the antenna is a T-shaped antenna. When the adjustable component 13 is disconnected, the antenna is a monopole antenna.

It can be learned from the foregoing description that, when the radiating element 12 includes the two radiating patches, and the feeder 11 controls an electrical connection between the radiating patches by using the adjustable component 13, the radiating patches can form radiators of different shapes, and further form different structure forms of the antenna 10. Therefore, the different structure forms of the antenna 10 may be selected based on a low frequency status or a high frequency status to send a signal, so as to improve the communication effect of the antenna 10.

It can be learned from the foregoing specific embodiment that, in the antenna 10 provided in this embodiment, a structure of the radiating element 12 and a manner of a connection between the feeder 11 and the radiating element 12 are changed, so that the communication effect of the antenna 10 can be effectively improved.

In addition, an embodiment of the present invention further provides a mobile terminal. The mobile terminal may be a mobile phone, a notebook computer, a tablet computer, or another common mobile terminal. In addition, regardless of a specific mobile terminal that is to be used, the foregoing antenna 10 is included.

In the foregoing technical solution, the radiating element 12 includes the two radiating patches, and the feeder 11 controls an electrical connection between the radiating patches by using the adjustable component 13, so that the radiating patches can form radiators of different shapes, and further form different structure forms of the antenna 10. Therefore, the different structure forms of the antenna 10 may be selected based on a low frequency status or a high frequency status to send a signal, so as to improve the communication effect of the antenna 10.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna, comprising:
   a feeder comprising a first side and a second side;
   an adjustable component disposed on the feeder, wherein the adjustable component is configured to control the feeder; and
   a radiating element comprising:
   a first radiating patch comprising a first extension part extending to the second side of the feeder; and
   a second radiating patch comprising a second extension part extending to the second side of the feeder, wherein a first end of the second extension part away from the feeder is electrically coupled to a first end of the first extension part away from the feeder,
   wherein the first radiating patch and the second radiating patch are located on the first side of the feeder and form a loop with the feeder,
   wherein the adjustable component is further configured to control the second radiating patch,
   wherein the adjustable component is located between the first radiating patch and the second radiating patch, and
   wherein the antenna is operable in a half wavelength loop mode and a full wavelength loop mode when the adjustable component is decoupled, and wherein the antenna is operable in a quarter wavelength short arm T-shaped antenna mode and a half wavelength full arm T-shaped antenna mode when the adjustable component is coupled.

2. The antenna of claim 1, wherein the first end of the first extension part is electrically coupled to the first end of the second extension part by a spring.

3. The antenna of claim 1, wherein a first end of the first radiating patch away from the feeder is electrically coupled to a first end of the second radiating patch away from the feeder by a spring.

4. The antenna of claim 1, wherein the antenna is operable at four resonance frequencies between 0.6 GHz and 3 GHz.

5. The antenna of claim 1, wherein the radiating element further comprises a branch, and wherein the branch is electrically coupled to the first radiating patch.

6. The antenna of claim 1, wherein the radiating element further comprises a branch, and wherein the branch is electrically coupled to the second radiating patch.

7. The antenna of claim 1, wherein the adjustable component comprises a control switch.

8. The antenna of claim 1, wherein the adjustable component comprises an adjustable capacitor.

9. The antenna of claim 1, wherein the second radiating patch comprises a middle frame of a mobile terminal, or a first flexible circuit board, and wherein the first radiating patch is a second flexible circuit board.

10. The antenna of claim 1, wherein the adjustable component comprises an inductor.

11. A mobile terminal, comprising an antenna, wherein the antenna comprises:
   a feeder comprising a first side and a second side, wherein an adjustable component is disposed on the feeder and is configured to control the feeder; and
   a radiating element comprising:
      a first radiating patch comprising a first extension part extending to the second side of the feeder; and
      a second radiating patch comprising a second extension part extending to the second side of the feeder, wherein a first end of the second extension part away from the feeder is electrically coupled to a first end of the first extension part away from the feeder,
   wherein the first radiating patch and the second radiating patch are located on the first side of the feeder and form a loop with the feeder,
   wherein the adjustable component is further configured to control the second radiating patch,
   wherein the adjustable component is located between the first radiating patch and the second radiating patch, and
   wherein the antenna is operable in a half wavelength loop mode and a full wavelength loop mode when the adjustable component is decoupled, and wherein the antenna is operable in a quarter wavelength short arm T-shaped antenna mode and a half wavelength full arm T-shaped antenna mode when the adjustable component is coupled.

12. The mobile terminal of claim 11, wherein the first end of the first extension part is electrically coupled to the first end of the second extension part by a spring.

13. The mobile terminal of claim 11, wherein a first end of the first radiating patch away from the feeder is electrically coupled to a first end of the second radiating patch away from the feeder by a spring.

14. The mobile terminal of claim 11, wherein the antenna is operable at four resonance frequencies between 0.6 GHz and 3 GHz.

15. The mobile terminal of claim 11, wherein the radiating element further comprises a branch, and wherein the branch is electrically coupled to the first radiating patch.

16. The mobile terminal of claim 11, wherein the radiating element further comprises a branch, and wherein the branch is electrically coupled to the second radiating patch.

17. The mobile terminal of claim 11, wherein the second radiating patch comprises a middle frame of the mobile terminal, or a first flexible circuit board, and wherein the first radiating patch comprises a second flexible circuit board.

18. The mobile terminal of claim 11, wherein the adjustable component comprises a control switch.

19. The mobile terminal of claim 11, wherein the adjustable component comprises an adjustable capacitor.

20. The mobile terminal of claim 11, wherein the adjustable component comprises a filtering network.

\* \* \* \* \*